Patented Sept. 26, 1944

2,359,266

UNITED STATES PATENT OFFICE 2,359,266

DICHLOROMALONONITRILE AS AN INSECTICIDE

Ingenuin Hechenbleikner, Stamford, Conn., assignor to American Cyanamid Company, New York, N. Y., a corporation of Maine No Drawing. Application July 31, 1942,
Serial No. 453,037

1 Claim. (Cl. 167—22)

The present invention relates to dichloromalononitrile as an insecticide.

It has been discovered that dichloromalononitrile provides a new and effective means for controlling insects, particularly those insects which infest grain, such as for example the granary weevil, rice weevil, confused flour beetle and the like, and for the extermination of such pests as roaches, bed bugs and carpet beetles which frequent dwellings.

This new insecticidal agent is a colorless liquid having a boiling point of 95°–96° C. at 760 mm. It may be prepared by passing chlorine into malononitrile under reflux on a steam bath and then distilling under reduced pressure to recover the product. The chlorination proceeds slowly and may be hastened by adding a very small amount of iodine and irradiating the mixture with strong artificial light.

When used as a fumigant, the compound either alone or in admixture with others may be applied, as for example, by atomizing or vaporizing with or without heat into the enclosure a measured quantity of the material either at atmospheric pressure or at reduced air pressures. The compound may also be introduced into the space to be fumigated in the form of impregnated solids such as kieselguhr or cellulosic board or other absorbent bodies carrying the compound. It may also be used in the form of solutions or emulsions from which it is subsequently vaporized.

The invention will be illustrated in greater detail by the fumigation tests listed in the following table. The period of exposure is one hour for each test.

| Insect | Dosage of dichloromalononitrile oz./1000 cu. ft. | Per cent kill |
|---|---|---|
| Rice weevils | 20 | 70.7 |
| Do | 40 | 99.0 |
| Confused flour beetles | 10 | 67.9 |
| Do | 20 | 100.0 |
| Carpet beetle larvae | 20 | 95.0 |
| Do | 30 | 100.0 |

Dichloromalononitrile is a strong lachrymator and hence serves warning as to spaces being fumigated therewith.

This compound may be used alone or in admixture with other fumigants, insecticides or diluents. It has sufficiently low inflammability to be safely used as a fumigant.

While the invention has been described with particular reference to specific embodiments it is to be understood that it is not to be limited thereto but is to be construed broadly and restricted solely by the scope of the appended claim.

What is claimed is:

A method of combating insects which includes applying thereto a toxic quantity of dichloromalononitrile.

INGENUIN HECHENBLEIKNER.